(12) United States Patent
Reimer et al.

(10) Patent No.: US 8,119,096 B2
(45) Date of Patent: Feb. 21, 2012

(54) METHOD FOR THE PRODUCTION OF A FINELY CRYSTALLINE BOEHMITE AND APPLICATION OF SAID BOEHMITE AS FLAME RETARDANT IN PLASTICS

(75) Inventors: Alfred Reimer, Furth im Wald (DE); Reiner Sauerwein, Steinberg (DE); Manfred Sorgalla, Schwandorf (DE); Ludwig Edenharter, Burglengenfeld (DE)

(73) Assignee: Nabaltec AG, Schwandorf (DE)

( * ) Notice: Subject to any disclaimer, the term of this patent is extended or adjusted under 35 U.S.C. 154(b) by 1017 days.

(21) Appl. No.: 11/685,951

(22) Filed: Mar. 14, 2007

(65) Prior Publication Data

US 2007/0217993 A1    Sep. 20, 2007

(30) Foreign Application Priority Data

Mar. 15, 2006    (DE) .......................... 10 2006 012 268

(51) Int. Cl.
C01F 7/02    (2006.01)

(52) U.S. Cl. ....................................................... 423/625

(58) Field of Classification Search ........... 423/625–626
See application file for complete search history.

(56) References Cited

U.S. PATENT DOCUMENTS

| 2,623,865 A | 12/1952 | Dietz |
| 4,117,105 A | 9/1978 | Hertzenberg et al. |
| 4,427,785 A * | 1/1984 | Prochazka et al. ............ 501/128 |
| 4,505,866 A * | 3/1985 | Oguri et al. ..................... 264/42 |
| H189 H | 1/1987 | Bauer |
| 4,732,741 A | 3/1988 | Duncan et al. |
| 5,194,243 A | 3/1993 | Pearson et al. |
| 6,143,816 A | 11/2000 | Prescher et al. |
| 6,413,308 B1 | 7/2002 | Xu et al. |

FOREIGN PATENT DOCUMENTS

| DE | 38 79 584 | 9/1993 |
| DE | 198 12 279 | 5/1999 |
| DE | 692 31 902 | 10/2001 |
| DE | 600 15 345 | 10/2005 |
| EP | 0 304 721 | 3/1993 |
| EP | 0 581 875 | 2/1994 |
| EP | 1 200 350 | 5/2002 |
| JP | 63265810 | 11/1988 |
| WO | WO 2005/100244 | 10/2005 |

OTHER PUBLICATIONS

European Search Report for EP 07 00 4497 and English translation thereof.
German Office Action for DE 10 2006 012 268.2-41.

* cited by examiner

Primary Examiner — Daniel C. McCracken
(74) Attorney, Agent, or Firm — Nils H. Ljungman & Associates

(57) ABSTRACT

Method for the production of a finely crystalline boehmite and application of said boehmite as flame retardant in plastics. The method involves mixing aluminum monohydrate with a boehmite crystal structure in water to form an aqueous dispersion of said aluminum monohydrate in said water, and then grinding the dispersion while maintaining the dispersion in a pH range of 2 to 4 and forming boehmite seed crystals. The boehmite seed crystals can then optionally be mixed with a hydrate and a basic aqueous solution to form a dispersion which may be heated to convert at least a substantial portion of the aluminum monohydrate to boehmite.

15 Claims, 3 Drawing Sheets

METHOD FOR THE PRODUCTION OF A FINELY CRYSTALLINE BOEHMITE AND APPLICATION OF SAID BOEHMITE AS FLAME RETARDANT IN PLASTICS

REFERENCE TO RELATED APPLICATIONS

The present application claims priority to German patent application 10 2006 012268.2, filed Mar. 15, 2006, the entire contents of which is hereby incorporated by reference.

BACKGROUND

1. Technical Field

This application relates to a method for the production of a finely crystalline boehmite and application of said boehmite as flame retardant in plastics.

2. Background Information

From U.S. Pat. No. 4,117,105 the conversion of aluminumtrihydrate to well dispersable boehmite is known. According to one method, aluminumtrihydrate with a BET-surface of 0.2 to 15 $m^2/g$ is calcined at temperatures between 200 up to 800° C. for 2 to 17 hours, until the BET-surface has risen to 250 to 800 $m^2/g$. Then a slurry of the calcined alumina is rehydrated at a temperature of 140 to 200° C. for 0.5 to 6 hours in an autoclave.

The Braunauer-Emmet-Teller (BET) method is a method of measuring the amount of gas absorbed on a solid surface. It was first published by its creators in 1938 in a journal; the article was titled "Adsorption of Gases in Multimolecular Layers".

A flame retardant plastic composition and a method for producing a filler material is known from German Patent No. 19812279 C1. The plastic composition consists of 55 to 75% boehmite in an orthorhombic crystal structure, wherein, depending on temperature control, the BET-surface varies between 14.75 and 17.25 $m^2/g$. As filler material boehmite with a grain diameter of 0.5 up to 3 µm is applied.

From German Patent No. 69231902 T2 a method for the growth of crystals, especially crystals consisting of metal oxides, at increased speed is known. In said method BET-surfaces in a range of 40 $m^2/g$ at a crystal size of roughly 50 nm are obtained. Within said method a feed solution with a pH-value of 3 to 11 is provided for precipitation on a seed crystal, which comprises a metal oxide species, which is sufficiently insoluble in the aqueous medium, in order to provide a solid center of growth. The treatment is then carried out under hydrothermal conditions, wherein feed material is added until the end of crystal growth.

In Japanese Patent No. 63265810 A a method is described, in which smooth $\alpha$-$Al_2O_3$-spheres are obtained from an aluminumhydrate, wherein aluminumhydrate is ground in wet condition at a pH-value between 1 and 4. Said $\alpha$-$Al_2O_3$ is obtained subsequently by calcination at 1350 to 1500° C.

From the production of the ion conductor beta-alumina, it is known from German Patent No. 3617115 A1 to mix boehmite with water and to adjust the pH-value of the mixture with acetic acid to a pH-value of 4. The mixture is then ground and sodium oxide and a spinel-stabilizator are mixed into the ground mixture in aqueous solution whereafter the solution is peptised, e.g. by acidifying anew to a pH of 4 with acetic acid and the following production of a gel at raised temperatures (80° C. for 20 minutes). The product can preferably be formed into a self-supporting commodity, consisting of beta-alumina, by isostatic pressing.

A method for the production of quasi-crystalline boehmite from a boehmite-precursor by application of seed crystals in hydrothermal treatment is known from German Patent No. 60015345 T2. Also ground boehmite crystals can be applied as crystals, wherein the hydrothermal reaction is carried out at pH-values equal or smaller than 7. Furthermore the production of microcrystalline boehmite and ceramic bodies is described in German Patent No. 3879584, wherein a precursor of boehmite and boehmite seed crystals are applied under hydrothermal conditions at pH-values of 8 or higher and temperatures of above 130° C. A method for the production of finest-particulate seed crystals is known from U.S. Statutory Invention Registration No. H189. With said seed material alpha alumina is obtained by applying the seed material in a boehmite-gel and transformation at relatively moderate temperatures into finely crystalline alpha alumina. Said material is applied within electrical industrial production or as abrasive.

For the application in flame retardants in plastic compositions a finely crystalline boehmite is required, having a low surface and a low pore volume. The flame retardant should show good and easy miscibility with said plastic compounds while having a high fraction at the total composition and also a high level of inflammability or non-flammability should be obtained. Furthermore the properties of mechanical strength like tensile strength and elongation at break should be on a high level.

Object or Objects

An object of at least one possible embodiment of the present application is to provide a method for production of fine crystalline boehmite having a low surface and a low pore volume, which is easily miscible into plastic compounds at a high fraction of the total composition and provides a high level of inflammability or non-flammability while enabling excellent properties of mechanical strength.

SUMMARY

At least one possible embodiment of the present application is a method for production of fine crystalline boehmite having a low surface and a low pore volume, which is easily miscible into plastic compounds at a high fraction of the total composition and provides a high level of inflammability while enabling excellent properties of mechanical strength.

According to at least one possible embodiment of the present application, a fine-crystalline boehmite is provided having an average grain diameter of D50 in the range of 50 to 400 nm in one embodiment, in the range of 100 to 300 nm in another embodiment, or in the range of 150 to 250 nm in yet another embodiment.

Furthermore the micro-particulate boehmite has a BET-surface in the range of 10 to 40 $m^2/g$, more preferably 15 to 35 $m^2/g$, most preferably 15 to 30 $m^2/g$. In a further embodiment the boehmite has a pore volume in the range of 0.05 to 0.5 $cm^3/g$, especially preferred 0.1 to 0.4 $cm^3/g$.

D50 is the median diameter where for example, if D50 is 50 nanometers, 50% of the grains are smaller than 50 nanometers and 50% of the grains are larger than 50 nanometers essentially.

According to at least one possible embodiment of the present application, the predescribed fine-crystalline boehmite with low surface is produced from a hydrate source by the method of autocatalytic, hydrothermal crystallization. Autocatalytic generally describes a reaction in which the reaction product itself is a catalyst for the reaction. Hydrothermal generally describes a technique for crystallization of substances from higher temperatures at higher pressures. The method will be described in the following. According to the embodiment hereof, it is essential or highly desirable during implementation of the method to apply a special type of seed crystal. The properties of the type of seed crystal as well as a method for its production are explained in detail in the following.

For the production of the embodiment of the seed crystal an aluminummonohydrate source is used. The aluminummonohydrate source (AlO(OH)) is of boehmitic crystal structure and has an appropriate particle size with a D50 grain size of about 500 nm or larger as well as a BET-surface of 20 m$^2$/g or larger. Such aluminummonohydrate sources can be obtained in trade for example under the commercial designation APYRAL® produced by Nabaltec AG. Germany, located at Nabaltec AG, Alustrasse 50-52, 92421 Schwandorf, Federal Republic of Germany.

Subsequently an aqueous dispersion is produced from the aluminummonohydrate source and said dispersion is ground, preferably in a ball-mill. A ball mill is generally a type of mill that uses either balls or pebbles, usually ceramic, to reduce a wet or dry material down to specified size by grinding the material with the balls or pebbles.

Surprisingly it turned out that during grinding of the aluminummonohydrate source in an aqueous suspension at a pH-value in the range of 2 to 4 in one embodiment, in the range of 2.5 to 4.5 in another embodiment, or even at a pH-value of 3 in yet another embodiment, the BET-surface and the pore volume increase only slightly when compared to grinding in neutral or slightly basic dispersion. Organic acids, especially acetic acid, turned out to be especially appropriate. It may be assumed that organic acids promote the creation of smooth fractured surfaces during tribochemical reaction, which takes place during grinding between the grinding gear, the dispersion liquid and the fracturing surface of the boehmite. Tribochemistry is generally defined as a field of chemistry that focuses on chemical reactions occurring on the surface of an object or substance.

Acetic acid showed in a sequence of experiments an optimal or desirable combination of acid strength, stability, solubility of its salts and miscibility with water. The stronger acids like formic acid or oxalic acid, tended to decompose at higher reaction temperature while organic acids with longer carbon chains, which are less miscible with water, like pentane- and hexane-acid showed a considerably decreased velocity of reaction and produced salts which are hardly soluble. With the application of acetic acid while keeping the reaction temperature between 50° C. and 70° C. a quick transformation and grinding could always be carried out, without the acetic acid decomposing or producing insoluble salts to an undesirable or unacceptable degree.

The above-discussed embodiments of the present invention will be described further herein below. When the word "invention" or "embodiment of the invention" is used in this specification, the word "invention" or "embodiment of the invention" includes "inventions" or "embodiments of the invention", that is the plural of "invention" or "embodiment of the invention". By stating "invention" or "embodiment of the invention", the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

DESCRIPTION OF EMBODIMENT OR EMBODIMENTS

Figure 1:
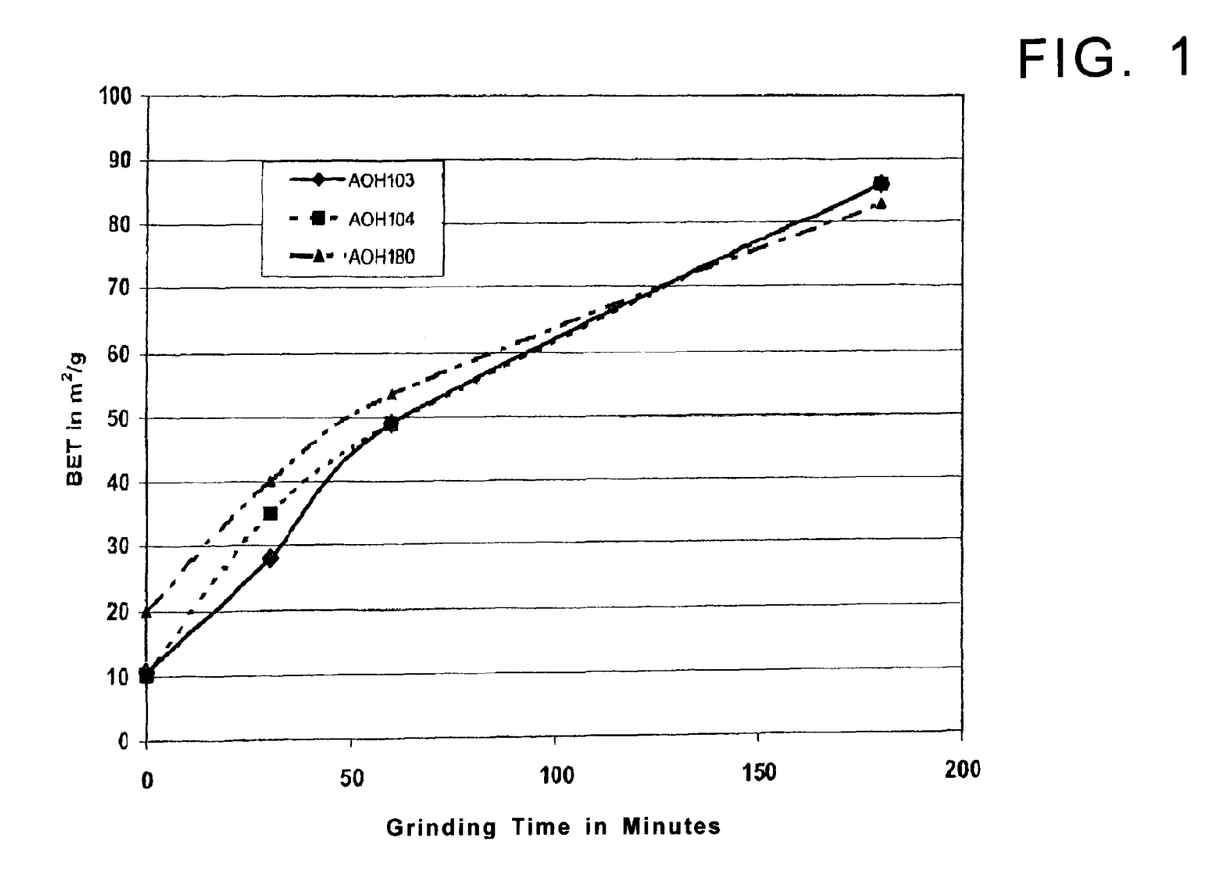
FIG. 1 shows the evolution of the BET-surface in relation to the duration of grinding for 3 crystalline precursor boehmites.

FIG. 1 displays the evolution of the BET-surface in relation to the duration of grinding for 3 crystalline precursor boehmites as described in table 1. The results of a grinding according to a known process in neutral aqueous dispersion are shown. The concentration of solids was 10% in relation to the boehmitic aluminummonohydrate-source. Table 1 shows the average grain size as well as BET-surface of the applied precursor substances prior to grinding. The determination of the BET-surface was carried out according to DIN 66131; likewise the following BET-values (DIN=German Industrial Standard).

TABLE 1

| D50 (nm) | BET (m$^2$/g) | commercial designation |
|---|---|---|
| 3000 | 10 | AOH 103 |
| 1300 | 10 | AOH 104 |
| 600 | 20 | AOH 180 |

As can be seen from FIG. 1, the BET-surface increases for all 3 precursor boehmites as could or should be expected with increasing duration of grinding and the respective decrease of the size of the crystals. The course of evolution of the BET-surface in relation to the duration of grinding at a maximum duration of grinding of 3 hours (180 minutes) is demonstrated. The dispersion of the precursor-boehmites has a pH-value of 9.

Figure 2:
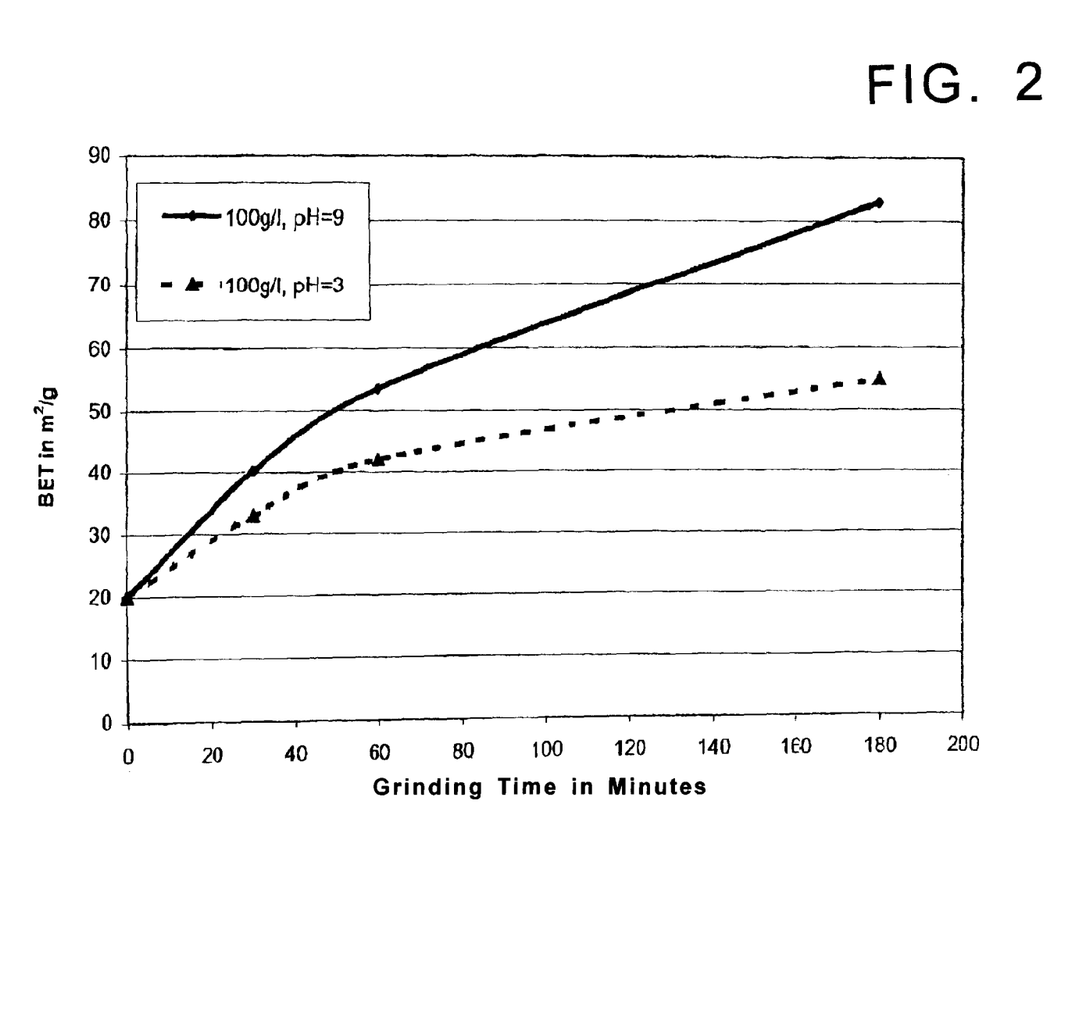
FIG. 2 shows a comparison of the evolution of BET-surface in relation to the duration of grinding for a time span of 180 minutes, wherein a dispersion having a pH-value of 9 and second dispersion having a pH-value of 4 are compared.

FIG. 2 shows a comparison of the evolution of BET-surface in relation to the duration of grinding for a time span of 180 minutes, wherein a dispersion having a pH-value of 9 and second dispersion having a pH-value of 4 are compared. It can be seen from this figure that the increase of BET-surface is significantly less for the acidic dispersion. In both comparative experiments boehmite of the type AOH 180 according to Table 1 was applied.

Figure 3:
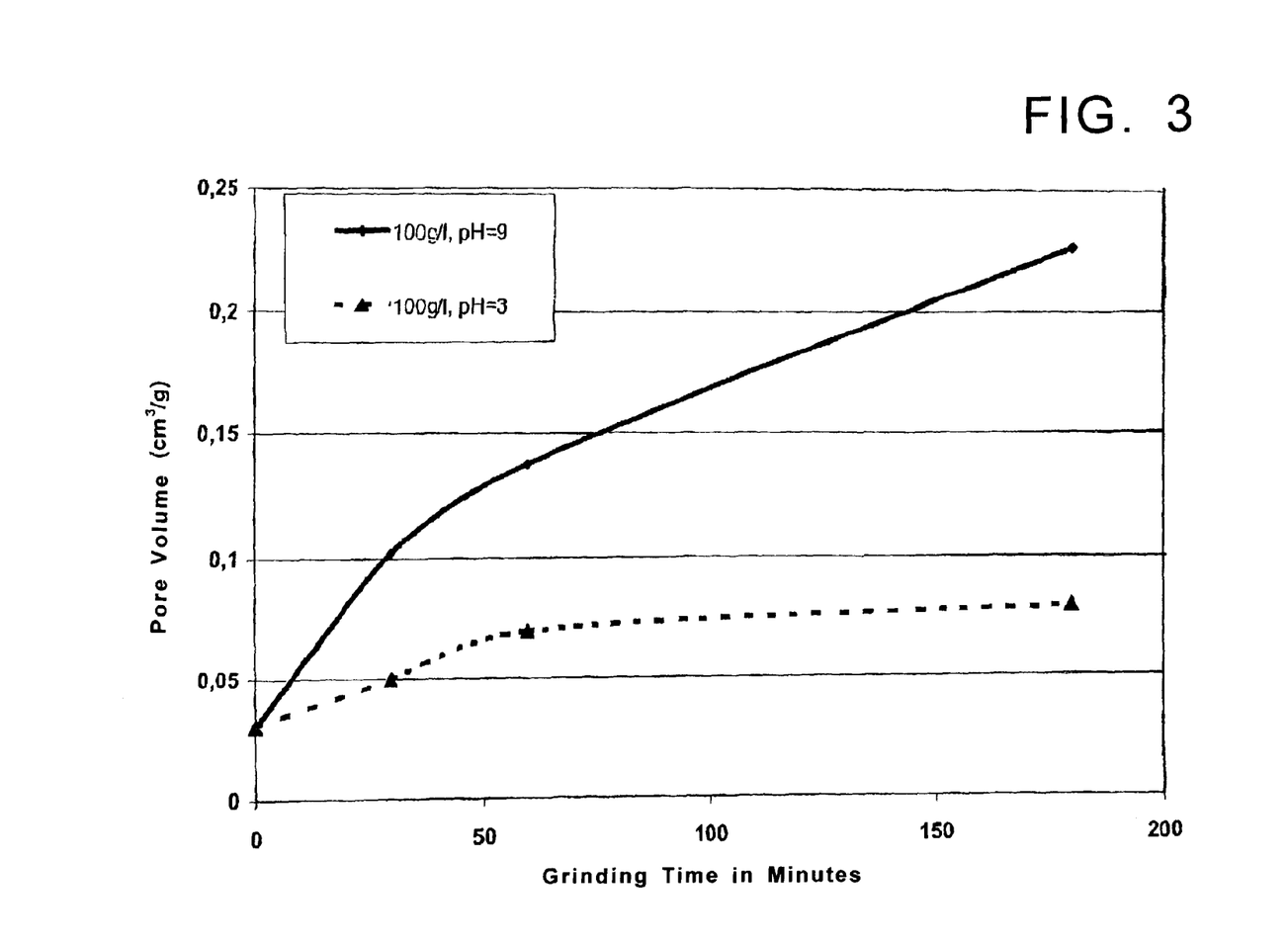
FIG. 3 shows the results of the determination of the evolution of pore volumes during the experiments of FIG. 2.

FIG. 3 shows the results of the determination of the evolution of pore volumes during the experiments of FIG. 2. It is obvious that the pore volume in the acidic dispersion increases during grinding little or surprisingly little, while the pore volume of the commonly prepared dispersion increases considerably. The determination of the pore volume was carried out according DIN 66134 via nitrogen-sorption at 77 K with 99.99% pure, dry nitrogen; all following pore volumes likewise. The pore volume was determined from the nitrogen adsorption or nitrogen desorption branch respectively of the isotherms according to Gurwitsch. Gurwitsch noticed that while weights of liquid taken up were considerably different, the volumes absorbed were substantially constant (written by Alfred Hirschler and Thomas Mertes, entitled "Liquid-Phase Absorption Studies Related to the Arosorb Process", Industrial and Engineering Chemistry, page 193, February 1955).

Further experiments with varied concentration of solids of boehmitic aluminummonohydrate source confirmed the situation depicted in FIG. 3. With a solid fraction, concerning the boehmitic aluminummonohydrate source, in the range of 5 to 50% in one possible embodiment or in the range of 10 to 25% in another possible embodiment, the described change of pore volume in acidic dispersion could always or usually be found.

Furthermore the temperature of the dispersion was kept in a range of 50 to 70° C. in one possible embodiment or at a temperature of 60° C. in another possible embodiment, during grinding. The cooling of the dispersion can be carried out with known cooling-facilities. If the heat generated during a grinding reaction is removed via cooling and the temperature is kept between 50 and 70° C., the amount of water vaporized or evaporated during grinding is negligibly small. If temperature peaks of 80° C. or more occur during grinding, for example, the water content may be controlled at intervals of 10 minutes and water may have to be refilled as needed. With a grinding reaction at 60° C. a dispersion can often be ground for several hours without the refilling of water becoming necessary. Especially when applying organic acids the amount of vaporized or evaporated acid is generally so little, that ignitable mixtures of acids and air are generally securely prevented.

The obtained product is applied as seed crystal for hydrothermal synthesis of boehmite in the following. When the grinding has reached completion the dispersion can be applied directly as a dispersion of seed crystals.

In the following, the method for the production of the fine-crystalline boehmite with low surface via autocatalytic hydrothermal crystallization with application of the previously described boehmite-seed crystal is explained.

For carrying out the autocatalytic hydrothermal crystallization, an alkaline aqueous dispersion is provided, comprising an applicable hydrate source such as $(Al(OH)_3)$ as well as the previously described type of embodiment seed crystal. The hydrate source which is produced from a dispersion, has a grain size distribution D50 of 0.5 to 100 μm in at least one possible embodiment, 0.5 to 10 μm in another possible embodiment, or 0.5 to 2 μm in yet another embodiment. The concentration of the hydrate source in the dispersion is normally adjusted to 10 to 500 (g/l) in at least one possible embodiment, 50 to 150 (g/l) in another possible embodiment, or 90 to 110 (g/l) in yet another possible embodiment. The concentration of the sodium hydroxide solution within the dispersion can be 4 to 50 in one possible embodiment, 30 to 40 (g/l) in another embodiment in relation to free $Na_2O$. The concentration of solids concerning the seed crystal is generally adequately set to 0.5 to 50% in one possible embodiment, 1 to 20% in another possible embodiment, or even 5 to 15% in yet another possible embodiment, each in relation to the hydrate source.

The autocatalytic hydrothermal crystallization of the previously described dispersion is carried out in an adequate autoclave. The reaction temperature is within a range of 110 to 180° C. in at least one possible embodiment, within a range of 120 to 150° C. in another possible embodiment, or even within a range of 125 to 135° C. in yet another possible embodiment. The reaction time is between 4 up to 24 hours depending on the rate of consumption of the hydrate source.

In one possible embodiment, the method can be carried out in a chemiclave, which is a specific type of autoclave. A possible type of chemiclave is for example manufactured by Alpha Multiservices, Inc. 706 Brook Hollow Dr., Conroe, Tex. 77385-9109, U.S.A.

The production of the embodiment type of seed crystal as well as its advantages compared to the known process as well as the production of the embodiment boehmite via autocatalytic, hydrothermal crystallization while applying the previously introduced type of seed crystal, will be explained further in the following examples.

EXAMPLE 1

Production of an embodiment type of seed crystal 300 g of a finely crystallized aluminummonohydrate with a specific surface of 20 $m^2/g$ and an average grain diameter D50 of 500 up to 600 nm (obtainable by the commercial designation APYRAL® AOH 180, fabricated by Nabaltec AG. Germany) were dispersed in 3 l (liters) water using a laboratory stirring unit. Said dispersion was adjusted to a pH-value of about 3 via the addition of acetic acid and was ground in a laboratory ball-mill. A ball-mill of the type, an example of which could possibly be (PML H/V) of the company Drais, located at 40 Whitney Road, Mahwah, N.J., 07430, was applied. As grinding media milling balls of 300 to 400 micrometer diameter made from yttria stabilized zirconia were applied. The dispersion was ground for up to 3 hours. (Yttria=yttrium oxide, $Y_2O_3$) The temperature was kept at 60° C.

Samples were taken from the initial substance as well as after 30 min., 60 min. and 180 min. of grinding. Table 2 shows the important parameters of the resulting products.

TABLE 2

| duration of grinding | commercial designation | BET-surface $m^2/g$ | pore volume $cm^3/g$ | particle size (D50) nm* |
|---|---|---|---|---|
| initial | ApAOH180 | 20 | 0.03 | 500-600 |
| 30 min | ApAOH18_0.5 h_pH3 | 33 | 0.05 | 400-500 |
| 60 min | ApAOH180_1 h_pH3 | 42 | 0.07 | 300-400 |
| 180 min | ApAOH180_3 h_pH3 | 50 | 0.08 | 200-300 |

*optically determined via SEM-picture
SEM stands for Scanning Electron Microscope. Such a microscope can be obtained from CamScan USA Inc., located at 508 Thomson Park Drive, Cranberry Township, PA 16066-6425.

EXAMPLE 2

Comparative Example 300 g of a finely crystallized aluminummonohydrate with a specific surface of 20 $m^2/g$ as in Example 1 were dispersed in water with a laboratory stirring unit. Said dispersion was ground in a laboratory ball-mill at a pH-value of about 9. As grinding media milling balls of 300 up to 400 micrometer diameter were applied. The dispersion was ground for up to 3 hours.

Samples were taken of the initial substance as well as after 30 min., 60 min. and 180 min. of grinding. Table 3 shows the important parameters of the resulting products.

TABLE 3

| duration of grinding | commercial designation | BET-surface $m^2/g$ | pore volume $cm^3/g$ | particle size (D50) in nm* |
|---|---|---|---|---|
| initial | ApAOH180 | 20 | 0.03 | 500-600 |
| 30 min | ApAOH180_0.5 h | 40 | 0.10 | 400-500 |
| 60 min | ApAOH180_1 h | 54 | 0.14 | 300-400 |
| 180 min | ApAOH180_3 h | 83 | 0.23 | 200-300 |

*optically determined via SEM-picture

EXAMPLE 3

Comparative Example 300 g of a finely crystallized aluminummonohydrate with a specific surface of 6 m$^2$/g (obtainable by the commercial designation APYRAL® AOH 60 Nabaltec AG. Germany) were ground with a laboratory ball-mill as in Example 1 but at a pH-value of 9. As grinding media milling balls of 300 up to 400 micrometer diameter of yttria stabilized zirconia were applied. The dispersion was ground for up to 3 hours.

Samples were taken of the initial substance as well as after 30 min, 60 min and 180 min of grinding. Table 4 shows the important parameters of the resulting products.

TABLE 4

| duration of grinding | commercial designation | BET-surface m$^2$/g | pore volume cm$^3$/g | particle size (D50) nm* |
|---|---|---|---|---|
| initial | ApAOH60 | 6 | 0.01 | 1000 |
| 60 min | ApAOH60_1 h | 44 | 0.09 | 600-700 |
| 120 min | ApAOH60_2 h | 65 | 0.14 | 400-500 |
| 180 min | ApAOH60_3 h | 78 | 0.17 | 200-300 |

*optically determined via SEM-picture

The comparison of the Examples 1 to 3 shows directly the advantages of the embodiment type of seed crystal as well as of its method of production. The embodiment Example 1 shows that starting from a commercially obtainable boehmite with a grain size diameter D50 of 500 to 600 nm and a BET-surface of 20 m$^2$/g a seed crystal can be obtained with a targeted grain size of 200 up to 300 nm while at the same time the BET-surface as well as the pore volume increase only moderately. In direct comparison with comparative Example 2, starting with identical boehmite as precursor, according to the known process a considerably larger BET-surface as well as considerably larger pore volumes are obtained when the targeted grain size is reached.

Even if a boehmite with a decreased BET-surface is used as a precursor, the production of the seed crystal according to the known process obtains a considerably larger BET-surface when reaching the targeted grain size of 200 up to 300 nm.

EXAMPLE 4

Comparative Example

Preparation of a seed crystal dispersion on the basis of a commercial pseudo boehmite. 100 g of amorphous aluminummonohydrate with a specific surface of 261 m$^2$/g and a particle size D50 of 37 μm as well as a pore volume of 0.37 cm$^2$/g (obtainable by the commercial designation Plural SB, fabricated by Condea Chemie Co. Germany, located at Überseering 40, Hamburg D-22297, Federal Republic of Germany) were dispersed in 3 l (liters) of water with a laboratory stirring unit. Subsequently the pH-value of the dispersion was set to 2 via slow addition of nitric acid. A grinding was not carried out.

Examples 5 to 10 describe the production of boehmites via autocatalytic, hydrothermal crystallization with the embodiment seed crystal according to Example 1 as well as the comparative seed crystals according to the Examples 2 to 4.

The following Examples 5 to 9 concern the production on laboratory scale.

100 g of finely precipitated aluminumhydroxide (commercial designation APYRAL® 40CD, Nabaltec AG.) and 10 g of seed crystal (in relation to the dry weight) in a dispersion produced according to the Examples 1 to 4 were mixed with a diluted base with roughly 40 (g/l) free Na$_2$O with a laboratory stirring unit to obtain a total volume of 1 l. Example 5 contains the embodiment type of seed crystal. The Examples 6, 7 and 9 contain the respective comparative seed crystals of the comparative Examples 2, 3 and 4. In Example 8, a non-ground boehmite of the type ApAOH180 according to the Examples 1 or 2 was applied as seed crystal.

The respective dispersions were each transferred into a laboratory autoclave (4520 Bench Top Reactor, manufactured by Parr Instrument Company, 211 Fifty Third Street, Moline, Ill., 61265-9984) heated to 145° C. and kept at that temperature during continuous stirring at 1125 rpm for 24 hours. After cooling down the reaction mixture, said mixture was filtered, washed and dried in a laboratory drying unit for 24 hours at 110° C.

Example 10 describes the production of the embodiment boehmite in a production-scale autoclave.

EXAMPLE 10

In a 8 m$^3$ stirring unit autoclave 1 m$^3$ of concentrated base was provided, containing 170 (g/l) of free Na$_2$O, and united with a dispersion consisting of 2800 l (liters) of water, 500 l (liters) of aqueous seed crystal dispersion containing 50 kg of seed crystal according to Example 1 and 500 kg of finely precipitated aluminumhydroxide (designation APYRAL® 60 D, Nabaltec AG. Germany). The resulting mixture was heated to 145° C. and kept at that temperature under continuous stirring at 900 rpm for 21 hours.

After cooling down the reaction mixture, said mixture was filtered via a Larox press filtering device and washed. The thus obtained filter cake was dried. Larox Corporation is located at P.O. Box 29, Tukkikatu 1, 53101 Lappeenranta, Finland.

Table 5 shows in comparison the product parameters of the boehmites obtained via autocatalytic crystallization under application of embodiment seed crystals according to Example 5 as well as Example 10 as well as the comparative seed crystals according to the Examples 6 to 9. The embodiment Example 5 shows the results obtained in a laboratory scale experiment while Example 10 shows the results of production carried out in production-scale.

Some examples of production-scale autoclaves, which may possibly be used in at least one possible embodiment, are available from Avure Autoclave Systems, Inc., 3721 Corporate Drive, Columbus, Ohio, 43231-7999, U.S.A.

Only the embodiment examples leads to a product, which has boehmitic crystal structure as well as a particle size with a D50 grain size distribution in the order of 200 nm while at the same time the BET-surface is less than 30 m$^2$/g and the pore volume is low.

The application of the comparative seed crystals according to the Examples 6, 7 as well as 9 leads to a product that also has a boehmitic structure and the desired order of magnitude of particle size but is characterized by a considerably larger surface. The application of a non-ground seed crystal according to Example 8 leads to a boehmite with sufficiently small BET-surface. However, said product has a considerably larger particle size than required and is therefore not applicable. The crystal phase was determined via XRD. XRD stands for X-ray Diffraction. Such products may be obtained from HUBER Diffraktionstechnik GmbH & Co. KG, located at Sommerstrasse 4, D-83253 Rimsting, Federal Republic of Germany.

The hydrothermally produced, embodiment product can on its own part be used as a seed crystal. Carried out synthesis with seed crystal dispersions with seed crystals from the embodiment hydrothermal synthesis of boehmites under identical reaction conditions led to results, which confirm the properties described in Table 5.

ried out with a tensile test machine of the type Tiratest 2705. The melt flow index according to ASTM D 1238 was determined with a Melt Flow Tester 6942, the oxygen index according to ISO 4589 (ASTM D 2863) was determined with a device of the type FTA of the Stanton Redcroft company. Stanton Redcroft in located in East Grinstead, UK.

TABLE 5

Parameters of products of produced boehmites according to Examples 5-10.

| example | type of seed-crystal | reactor | BET-surface $m^2/2$ | pore volume $cm^3/g$ | primary particle size (D50) nm* | XRD-phase | loss after HT-treatment % |
|---|---|---|---|---|---|---|---|
| Nr. 5 (embod.) | ApAOH180_3h_pH3 | laboratory-AC | 29 | 0.08 | 200 | boehmite | 16.8 |
| Nr. 6 (comp.) | ApAOH180_3h | laboratory-AC | 45 | 0.11 | 200 | boehmite | 16.7 |
| Nr. 7 (comp.) | ApAOH60_3h | laboratory-AC | 45 | 0.11 | 200 | boehmite | 16.6 |
| Nr. 8 (comp.) | ApAOH180 | laboratory-AC | 11 | 0.02 | 500-600 | boehmite | 16.8 |
| Nr. 9 (comp.) | Pural SB_pep | laboratory-AC | 78 | 0.19 | 300 | boehmite | 16.4 |
| Nr. 10 (embod.) | ApAOH180_3h_pH3 | productional-AC | 28 | 0.07 | 200 | boehmite | 16.9 |

*optically determined via SEM-picture
** determined via Cilas Lasergranulometer 1064
laboratory AC = laboratory autoclave, volume 2 l
productional AC = productional autoclave, volume 8 $m^3$
(embod.) = embodiment example;
(comp.) = comparative example The Cilas Company is located at 8, Avenue Buffon, B.P. 6319, Z.I. La Source, 45063 ORLEANS.

In the following the application of the embodiment produced boehmite as a flame retardant in plastic compositions is described.

Examples 11 to 13 show the application of the embodiment product as flame retardant in basic polymer compositions and the resulting advantages. Such plastic compositions are applied for example in the production of electrical cables as compound material for producing cable insulation as well as cable sheathings.

EXAMPLE 11

Table 6 summarizes the composition and the important characteristics of a plastic compound, based on an EVA-copolymer with a vinylacetate-content of 19 weight %. The comparative compositions C1 and C2 contain as sole flame retardant finely crystallized aluminumhydroxide with a specific surface of about 4 $m^2$/g (designation APYRAL® 40CD, Nabaltec AG. Germany) as well as 12 $m^2$/g (designation APYRAL® 120E, Nabaltec AG. Germany) concerning the BET-surface. The composition C3 contains aside the aluminumhydroxide additionally boehmite of the type AOH180 as described above.

The composition C4 contains the embodiment boehmite from Example 10 in combination with aluminumhydroxide. All compositions have a fraction of filler material of 60 weight %.

The compositions were produced with a dispersing kneading device of the type LDUK 1.0 of the company "Werner und Pfleiderer". Werner und Pfleiderer GmbH is located at Theodorstrasse 10, Stuttgart D-70466, Federal Republic of Germany. Sample bodies for the following experiments were cut from plates which were produced in a press of the type Schwabenthanpresse Polystat 300S by press melting. The mechanical examinations according to DIN 53504 were car- The determination of the level of inflammability was carried out according to the standard UL 94 V (UL=Underwriters Laboratories; an industrial union for standardization). A rectangular sample body with vertically arranged length was mounted upright and freely. The length/breadth/thickness was 125 mm/13 mm/3.2 mm. The flame of a Bunsen burner was applied to encompass for a duration of 10 seconds and a height of flame of 20 mm+−2 mm the lower, free end of the sample body. The length of time, in which the sample body kept burning after removal of the flame, was recorded. Then the sample body was again encompassed with the flame for 10 seconds as predescribed and the time in which the sample body kept burning after removal of the flame was recorded. The two periods of time of each sample were added and recorded. Five sample bodies were examined for each composition respectively. Compositions having in each of their samples a total burning time of equal to or less than 10 seconds and having a total burning time of all 5 samples of altogether 50 or less seconds and which produced during burning no flaming drops, were given the highest level of inflammability UL 94 V-0. Compositions in which the burning of each sample was more than 10 seconds but less than 30 seconds, and which showed a total burning time of all 5 samples of 250 seconds or less and equally produced no burning drops during burning, were given the level of inflammability of UL 94 V1. If the time of burning of a sample was longer and/or the production of flaming drops during examination could be observed, no level of inflammability could be given.

TABLE 6

| | composition | | | |
|---|---|---|---|---|
| | C1 | C2 | C3 | C4 |
| Escorene UL 00119 | 39.6 | 39.6 | 39.6 | 39.6 |
| Dynasylan AMEO | 0.4 | 0.4 | 0.4 | 0.4 |

TABLE 6-continued

|  | composition | | | |
|---|---|---|---|---|
|  | C1 | C2 | C3 | C4 |
| aluminumhydroxide 4 m²/g surface | 60 |  | 55 | 55 |
| aluminumhydroxide 12 m²/g surface |  | 60 |  |  |
| AOH180 |  |  | 5 |  |
| product from example 10 |  |  |  | 5 |
| total | 100 | 100 | 100 | 100 |

TABLE 7

|  | composition | | | |
|---|---|---|---|---|
|  | C1 | C2 | C3 | C4 |
| tensile strength (MPa) | 13.2 | 14.4 | 14.1 | 14.9 |
| elongation at break (%) | 210 | 165 | 194 | 209 |
| LOI (% O₂) | 35 | 40 | 36.5 | 39 |
| UL94 level of inflammability | none | V-1 | none | V-0 |
| MFI (cm³/10 min); 21.6 kg/190° C. | 5.1 | 0.9 | 4.3 | 3.7 |
| BET (m²/g) of the filler or the filler composition | 3.5 | 12 | 4.9 | 5.5 |

Escorene UL00119 is an EVA-copolymer of ExxonMobil. ExxonMobil is located at 13501 Katy Freeway, Houston, Tex., 77079-1398, USA. Dynasylan AMEO is an aminosilane of the Degussa AG. Dynasylan is a product of Degussa Corporation, which is located at 379 Interpace Parkway 379, Parsippany, N.J., 07054

| Tensile strength | derived from determination of elongation under tension according to DIN 53504 |
|---|---|
| Elongation at break | derived from determination of elongation under tension according to DIN 53504 |
| LOI | Limiting oxygen index (oxygen index) according to ISO 4589 |
| MFI | Melt flow index (melt index) according to ASTM D 1238 |

When comparing the results depicted in Table 7 concerning the properties as a flame retardant in respect of LOI and UL94V it shows that only the boehmite containing composition C4 is able to obtain the highest level of inflammability UL94V-0.

Application of an aluminumhydroxide with a higher specific surface according to composition C2 the LOI can be increased in comparison to composition C1, but only a level of inflammability of UL94V-1 can be obtained. Combination with a boehmite according to the known process as shown in composition C3, one can increase the LOI slightly, but no relevant level of inflammability according to UL94V can be obtained. Application of the boehmite leads not only to the highest level of inflammability but also improves the mechanical properties. The composition C4 shows additionally a high melt flow index, which results in an improved processability of the melt, like for example the extrusion.

EXAMPLE 12

The Example 12 shows plastic compositions C5 and C6 with the product and a reduced fraction of flame retardant while keeping the LOI.

In Table 8 composition C1 is given as a reference from Example 11. Additionally the properties of the compositions C5 and C6, having a reduced fraction of inorganic filler as a flame retardant in comparison to composition C1, are given.

TABLE 8

|  | composition | | |
|---|---|---|---|
|  | C1 | C5 | C6 |
| Escorene UL 00119 | 39.6 | 41.6 | 44.6 |
| Dynasylan AMEO | 0.4 | 0.4 | 0.4 |
| aluminumhydroxide 4 m²/g surface | 60 | 48 | 45 |
| product from Example 10 |  | 10 | 10 |
| total | 100 | 100 | 100 |
| tensile strength (MPa) | 13.2 | 14.8 | 14.7 |
| elongation at break (%) | 210 | 216 | 241 |
| LOI (% O₂) | 35.0 | 36.0 | 34.6 |
| MFI (cm³/10 min); 21.6 kg/190° C. | 5.1 | 2.0 | 3.6 |
| BET (m²/g) of the filler or the filler composition | 3.5 | 7.7 | 80 |

Composition C5 shows that in spite of reducing the fraction of flame retardant by 2% an increased LOI can be obtained. Composition C6 shows that while decreasing the fraction of flame retardant by 5% the LOI can be kept and at the same time, because of said reduced fraction and the presence of the boehmite, excellent tensile strength and elongation at break is obtained.

EXAMPLE 13

The example shows the effect of the finely crystallized particles on the LOI in polyamide (PA6).

Composition C7 contains the commercially crystalline boehmite ApAOH60 from comparative Example 2, while the composition C8 contains the boehmite according to Example 10.

TABLE 9

|  | composition | |
|---|---|---|
|  | C7 | C8 |
| Ultramid 5B | 70 | 70 |
| APYRAL ® AOH60 | 30 |  |
| product from Example 10 |  | 30 |
| total | 100 | 100 |
| LOI (% O₂) | 23 | 30.8 |

Utramid 5B is a polyamide 6 of BASF AG

By application of the embodiment boehmite a considerably higher LOI can be obtained.

Method for the production of a finely crystalline (or microcrystalline) boehmite with an average grain size diameter D50 in the range of 50 to 400 nm and a BET-surface in the range of 10 to 40 m²/g and a pore volume in the range of 0.05 to 0.5 m³/g via autocatalytic, hydrothermal crystallization and method for production of a crystalline seed for crystallization via grinding of an aluminummonohydrate source at a pH-value in the range of 2 to 4 and application of boehmite as a flame retardant in plastic compositions.

At least one possible embodiment of the present application concerns a method for the production of a finely-particulate boehmite with an average grain diameter within the area of 50 to 400 nm and a BET-surface within the area of 10 to 40 m²/g by autocatalytic, hydrothermal crystallization. At least one possible embodiment of the present application concerns furthermore the application of a finely crystalline boehmite as flame retardant in plastics.

All of the numeric ranges disclosed herein should be understood as disclosing more specific ranges or individual numbers therein in tens, ones, tenths, or hundredths. To further explain, the average grain diameter range of 50 to 400 nm, for example, should be understood to disclose any range or individual number therein in tens, ones, or tenths, such as, for example, ranges of 80 to 360 nm, 56 to 397 nm, or 62.7 to 378.4 nm, or, for example, individual numbers such as 230 nm, 196 nm, or 82.3 nm. Also, the boehmite pore volume range of 0.05 to 0.5 cm³/g, for example, should be understood to disclose any range individual number therein in tenths or hundredths, such as, for example, ranges of 0.1 to 0.4 cm³/g or 0.07 to 0.46 cm³/g, or, for example, individual numbers such as 0.3 cm³/g or 0.27 cm³/g. Therefore, all ranges disclosed herein should be understood as disclosing any range or individual number therein in the same manner as described above.

One feature or aspect of an embodiment is believed at the time of the filing of this patent application to possibly reside broadly in a boehmite characterized by an average grain size diameter D50 in the range of 50 to 400 nm, a BET-surface in the range of 10 to 40 m²/g and a pore volume in the range of 0.05 to 0.5 cm3/g.

Another feature or aspect of an embodiment is believed at the time of the filing of this patent application to possibly reside broadly in a method for the production of a seed crystal for the autocatalytic hydrothermal crystallization of boehmite comprising the steps of: a. producing an aqueous dispersion of an aluminummonohydrate source with boehmitic crystal structure; and b. grinding the dispersion characterized in that the pH-value is kept in a range of 2 to 4 during grinding.

Yet another feature or aspect of an embodiment is believed at the time of the filing of this patent application to possibly reside broadly in the method characterized in that the pH-value is adjusted with an organic acid, preferably acetic acid.

Still another feature or aspect of an embodiment is believed at the time of the filing of this patent application to possibly reside broadly in the method characterized in that the dispersion in step a) shows a fraction of solid content of 5 to 50 weight %, preferably 10 to 25 weight % of aluminummonohydrate-source.

A further feature or aspect of an embodiment is believed at the time of the filing of this patent application to possibly reside broadly in the method characterized in that in step b) the temperature of the dispersion is kept in a range of 50 to 70° C.

Another feature or aspect of an embodiment is believed at the time of the filing of this patent application to possibly reside broadly in the method characterized in that the aluminummonohydrate source has an average grain size diameter D50 of 500 nm or more as well as a BET-surface of 20 m²/g or more.

Yet another feature or aspect of an embodiment is believed at the time of the filing of this patent application to possibly reside broadly in a method for production of a boehmite with an average grain size diameter D50 in the range of 50 to 400 nm and a BET-surface in the range of 10 to 40 m²/g via autocatalytic hydrothermal crystallization comprising the steps of: c. providing an aqueous basic dispersion containing a hydrate source and a crystalline seed, d. heating the dispersion in an autoclave to a temperature in the range 110 to 180° C. until the hydrate source is essentially used up, and e. drying of the obtained product characterized in that the crystalline seed is produced according to at least one embodiment of the method a method for the production of a seed crystal for the autocatalytic hydrothermal crystallization of boehmite and/or is the product of a previous cycle of this method.

Still another feature or aspect of an embodiment is believed at the time of the filing of this patent application to possibly reside broadly in the method characterized in that the solid concentration of crystalline seed is 0.5 to 50%, preferably 1 to 20% in relation to the hydrate source.

A further feature or aspect of an embodiment is believed at the time of the filing of this patent application to possibly reside broadly in the method characterized in that the concentration of sodium hydroxide solution in the dispersion is 4 to 50 g/l, preferably 30 to 40 g/l in relation to free $Na_2O$.

Another feature or aspect of an embodiment is believed at the time of the filing of this patent application to possibly reside broadly in the method wherein the hydrate source has a grain size distribution D50 of 0.5 to 100 μm, preferably 0.5 to 10 μm and a concentration within the dispersion of 10 to 500 g/l, preferably 50 to 150 g/l.

Yet another feature or aspect of an embodiment is believed at the time of the filing of this patent application to possibly reside broadly in an application of the boehmite as a flame retardant in plastics especially in compositions for insulation or sheathings of electrical cables.

The components disclosed in the various publications, disclosed or incorporated by reference herein, may possibly be used in possible embodiments of the present invention, as well as equivalents thereof.

The purpose of the statements about the technical field is generally to enable the Patent and Trademark Office and the public to determine quickly, from a cursory inspection, the nature of this patent application. The description of the technical field is believed, at the time of the filing of this patent application, to adequately describe the technical field of this patent application. However, the description of the technical field may not be completely applicable to the claims as originally filed in this patent application, as amended during prosecution of this patent application, and as ultimately allowed in any patent issuing from this patent application. Therefore, any statements made relating to the technical field are not intended to limit the claims in any manner and should not be interpreted as limiting the claims in any manner.

The appended drawings in their entirety, including all dimensions, proportions and/or shapes in at least one embodiment of the invention, are accurate and are hereby included by reference into this specification.

The background information is believed, at the time of the filing of this patent application, to adequately provide background information for this patent application. However, the background information may not be completely applicable to the claims as originally filed in this patent application, as amended during prosecution of this patent application, and as ultimately allowed in any patent issuing from this patent application. Therefore, any statements made relating to the background information are not intended to limit the claims in any manner and should not be interpreted as limiting the claims in any manner.

All, or substantially all, of the components and methods of the various embodiments may be used with at least one embodiment or all of the embodiments, if more than one embodiment is described herein.

The purpose of the statements about the object or objects is generally to enable the Patent and Trademark Office and the public to determine quickly, from a cursory inspection, the nature of this patent application. The description of the object or objects is believed, at the time of the filing of this patent application, to adequately describe the object or objects of this patent application. However, the description of the object or objects may not be completely applicable to the claims as originally filed in this patent application, as amended during prosecution of this patent application, and as ultimately allowed in any patent issuing from this patent application. Therefore, any statements made relating to the object or objects are not intended to limit the claims in any manner and should not be interpreted as limiting the claims in any manner.

All of the patents, patent applications and publications recited herein, and in the Declaration attached hereto, are hereby incorporated by reference as if set forth in their entirety herein.

The summary is believed, at the time of the filing of this patent application, to adequately summarize this patent application. However, portions or all of the information contained in the summary may not be completely applicable to the claims as originally filed in this patent application, as amended during prosecution of this patent application, and as ultimately allowed in any patent issuing from this patent application. Therefore, any statements made relating to the summary are not intended to limit the claims in any manner and should not be interpreted as limiting the claims in any manner.

It will be understood that the examples of patents, published patent applications, and other documents which are included in this application and which are referred to in paragraphs which state "Some examples of . . . which may possibly be used in at least one possible embodiment of the present application . . . " may possibly not be used or useable in any one or more embodiments of the application.

The sentence immediately above relates to patents, published patent applications and other documents either incorporated by reference or not incorporated by reference.

The corresponding foreign and international patent publication applications, if any, namely, Federal Republic of Germany Patent Application No. 10 2006 012268.2, filed on Mar. 15, 2006, having inventors Dr. Alfred REIMER, Dr. Reiner SAUERWEIN, Manfred SORGALLA, and Ludwig EDENHARTER, and DE-OS 10 2006 012268.2 and DE-PS 10 2006 012268.2, are hereby incorporated by reference as if set forth in their entirety herein for the purpose of correcting and explaining any possible misinterpretations of the English translation thereof. In addition, the published equivalents of the above corresponding foreign and international patent publication applications, and other equivalents or corresponding applications, if any, in corresponding cases in the Federal Republic of Germany and elsewhere, and the references and documents cited in any of the documents cited herein, such as the patents, patent applications and publications, are hereby incorporated by reference as if set forth in their entirety herein.

All of the references and documents, cited in any of the documents cited herein, are hereby incorporated by reference as if set forth in their entirety herein. All of the documents cited herein, referred to in the immediately preceding sentence, include all of the patents, patent applications and publications cited anywhere in the present application.

The description of the embodiment or embodiments is believed, at the time of the filing of this patent application, to adequately describe the embodiment or embodiments of this patent application. However, portions of the description of the embodiment or embodiments may not be completely applicable to the claims as originally filed in this patent application, as amended during prosecution of this patent application, and as ultimately allowed in any patent issuing from this patent application. Therefore, any statements made relating to the embodiment or embodiments are not intended to limit the claims in any manner and should not be interpreted as limiting the claims in any manner.

The details in the patents, patent applications and publications may be considered to be incorporable, at applicant's option, into the claims during prosecution as further limitations in the claims to patentably distinguish any amended claims from any applied prior art.

The purpose of the title of this patent application is generally to enable the Patent and Trademark Office and the public to determine quickly, from a cursory inspection, the nature of this patent application. The title is believed, at the time of the filing of this patent application, to adequately reflect the general nature of this patent application. However, the title may not be completely applicable to the technical field, the object or objects, the summary, the description of the embodiment or embodiments, and the claims as originally filed in this patent application, as amended during prosecution of this patent application, and as ultimately allowed in any patent issuing from this patent application. Therefore, the title is not intended to limit the claims in any manner and should not be interpreted as limiting the claims in any manner.

The abstract of the disclosure is submitted herewith as required by 37 C.F.R. §1.72(b). As stated in 37 C.F.R. §1.72(b):

> A brief abstract of the technical disclosure in the specification must commence on a separate sheet, preferably following the claims, under the heading "Abstract of the Disclosure." The purpose of the abstract is to enable the Patent and Trademark Office and the public generally to determine quickly from a cursory inspection the nature and gist of the technical disclosure. The abstract shall not be used for interpreting the scope of the claims.

Therefore, any statements made relating to the abstract are not intended to limit the claims in any manner and should not be interpreted as limiting the claims in any manner.

The embodiments of the invention described herein above in the context of the preferred embodiments are not to be taken as limiting the embodiments of the invention to all of the provided details thereof, since modifications and variations thereof may be made without departing from the spirit and scope of the embodiments of the invention.

What is claimed is:

1. A method for the industrial production of boehmite comprising the steps of:
  A) mixing aluminum monohydrate, having a boehmite crystal structure, in water and thereby forming a first aqueous dispersion having a solid fraction of said boehmitic aluminum monohydrate in a range of 5 to 50 percent;
  B) grinding said first aqueous dispersion while maintaining said first aqueous dispersion in a pH range of 2 to 4 and forming boehmite seed crystals;
  C) mixing $Al(OH)_3$ and said boehmite seed crystals in a basic aqueous solution, and thereby forming a second aqueous dispersion having a concentration of $Al(OH)_3$ in a range of 10 to 500 grams per liter and having a solid fraction of said boehmite seed crystal in a range of between 0.5 to 50 percent; and D) heating said second aqueous dispersion in a temperature range of 110 degrees Celsius to 180 degrees Celsius for a time in a range between 4 to 24 hours to autocatalytically convert at least a substantial portion or essentially all of said Al(OH)$_3$ to boehmite having a median grain size diameter in the range of 50 to 400 nanometers and a surface area in the range of 10 to 40 meters squared per gram, measured by the Brunauer-Emmett-Teller method.

2. The method according to claim 1, further comprising the steps of:

E) repeating steps A and B using boehmite produced in step D to form boehmite seed crystals; and F) repeating steps C and D using boehmite seed crystals from step E to produce boehmite having a median grain size diameter in the range of 50 to 400 nanometers and a surface area in the range of 10 to 40 meters squared per gram, measured by the Brunauer-Emmett-Teller method.

3. The method according to claim 1, wherein said Al(OH)$_3$ has a median grain size distribution of 0.5 to 100 μm and a concentration within said second aqueous dispersion of 50 to 150 grams per liter.

4. The method according to claim 3, further comprising the steps of:

G) repeating steps A and B using boehmite produced in step D to form boehmite seed crystals; and H) repeating steps C and D using boehmite seed crystals from step G to produce boehmite having a median grain size diameter in the range of 50 to 400 nanometers and a surface area in the range of 10 to 40 meters squared per gram, measured by the Brunauer-Emmett-Teller method.

5. The method according to claim 1, further comprising the step of mixing said boehmite with a plastic to produce a flame retardant plastic.

6. The method according to claim 5, further comprising forming said flame retardant plastic into one of the group consisting of: insulation of electrical cables, and sheathings of electrical cables.

7. The method according to claim 1, wherein said Al(OH)$_3$ has a median grain size distribution of 0.5 to 10 μm and a concentration within said second aqueous dispersion of 50 to 150 grams per liter.

8. The method according to claim 7, wherein said step of maintaining said first aqueous dispersion in a pH range of 2 to 4 comprises adjusting the pH value with an organic acid.

9. The method according to claim 8, wherein said organic acid is acetic acid.

10. The method according to claim 9, wherein said step A comprises forming said first aqueous dispersion having a solid fraction of said boehmitic aluminum monohydrate in a range of 10 to 25 percent.

11. The method according to claim 10, wherein said step B further comprises the step of maintaining the temperature of said first aqueous dispersion in a range of 50° C. to 70° C. during grinding.

12. The method according to claim 11, wherein said boehmitic aluminum monohydrate of step A has a median grain size diameter of at least 500 nanometers and a Brunauer-Emmett-Teller surface of at least 20 meters squared per gram.

13. The method according to claim 12, further comprising the steps of:

I) repeating steps A and B using boehmite produced in step D to form boehmite seed crystals; and J) repeating steps C and D using boehmite seed crystals from step I to produce boehmite having a median grain size diameter in the range of 50 to 400 nanometers and a surface area in the range of 10 to 40 meters squared per gram, measured by the Brunauer-Emmett-Teller method.

14. The method according to claim 12, further comprising the step of mixing said boehmite with a plastic to produce a flame retardant plastic.

15. The method according to claim 14, further comprising forming said flame retardant plastic into one of the group consisting of: insulation of electrical cables, and sheathings of electrical cables.

* * * * *